United States Patent

[11] 3,584,428

| [72] | Inventor | David C. Falk |
| | | 131 26th St., Newport News, Va. 23607 |
| [21] | Appl. No. | 592,867 |
| [22] | Filed | Nov. 8, 1966 |
| [45] | Patented | June 15, 1971 |

[54] METHOD AND APPARATUS FOR PROCESSING SILAGE AND THE LIKE
3 Claims, 9 Drawing Figs.

[52] U.S. Cl. ...................................... 53/22B,
53/23, 53/24, 53/391
[51] Int. Cl. ...................................... B65b 31/04,
B65b 1/24, B65b 25/04
[50] Field of Search ........................................ 100/41, 42;
53/22 B, 23, 24, 112 B, 391

[56] References Cited
UNITED STATES PATENTS

| 247,544 | 9/1881 | Dietrichs | 53/24 |
| 2,241,943 | 5/1941 | Berch | 53/22 |
| 2,339,584 | 1/1944 | Rice | 53/23 X |
| 2,896,207 | 7/1959 | Wilson | 53/24 X |
| 3,218,778 | 11/1965 | Moreland | 53/112 |
| 3,228,166 | 1/1966 | Thiele | 53/24 |
| 3,253,379 | 5/1966 | Foradora | 53/24 X |
| 3,307,319 | 3/1967 | Christensen | 53/22 |
| 3,429,095 | 2/1969 | Huson | 53/24 |
| 3,451,185 | 6/1969 | Tezuka | 53/22 |
| 3,451,190 | 6/1969 | Tezuka | 53/124 |

Primary Examiner—Wayne A. Morse, Jr.
Attorney—Cushman, Darby and Cushman

ABSTRACT: This invention relates to the preparation, handling and storage of silage, haylage, high moisture grain and the like and in particular to a technique for preparing silage and the like in a manner which eliminates the need for storage facilities such as silos and much of the equipment conventionally employed in preparing silage and distributing the same. The technique involves the packaging of silage and the like in self-supporting units which are portable in the sense of being movable by conventional fork lift equipment and the like and which are protected against spoilage by aerobic bacteria. The technique includes the steps of compacting batches of fresh-chopped silage into bale form, preferably on a pallet, and covering and sealing the bale with a protective cover to prevent spoilage. In the preferred embodiment the compaction, palleting and covering are carried out by a mobile machine which is also adapted to cut and chop the crop as the machine moves over a field.

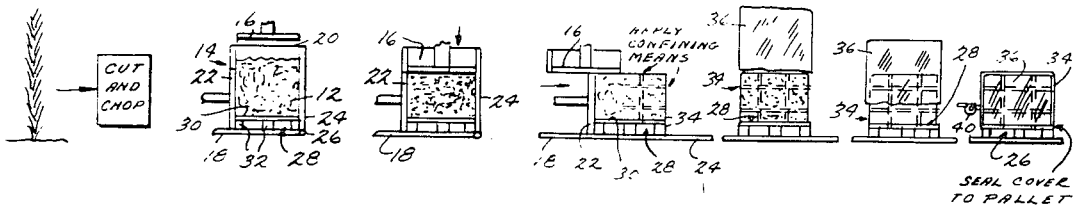

PATENTED JUN 15 1971

3,584,428

INVENTOR.
DAVID C. FALK
BY
Cushman, Darby & Cushman
ATTORNEYS

METHOD AND APPARATUS FOR PROCESSING SILAGE AND THE LIKE

The processing and use of a row crop for silage purposes includes, inherently, the steps of cutting and chopping the row crop, storage of the cut silage under conditions which prevent spoilage and dispensing of the stored silage, as needed, for feeding stock. Conventionally, the row crop is cut and chopped by a field harvester, hauled by wagons a silo, conveyed to the top of the silo by special equipment designed for this purpose and discharged into the silo. Each of these operations requires not only the equipment necessary to do the job but also the presence of operators. Subsequently, the silage is removed from the bottom of the silo, as needed, by hand or by special-purpose powered equipment.

A typical silo 30 feet tall and 20 feet in diameter will hold about 400 tons of silage and represents an initial cost of about $7,000. Less costly storage facilities are sometimes employed in the form of a pit silo or in the form of a large above ground pile of silage. The pit silo suffers the disadvantage that it is difficult to unload. In addition, the pit silo is usually an open-topped structure loosely covered only with a canvas or plastic sheet with the result that spoilage occurs readily. The open-pile method of storage also uses a loose sheet covering and is subject to high rates of spoilage.

It is the object of the present invention to eliminate much of the time, equipment and manpower conventionally employed in harvesting, transporting and storing of silage, haylage and high moisture grain and in the subsequent handling of the material during stock feeding. This is accomplished, primarily, by compacting or baling batches of fresh-cut material under pressure and packaging the compressed units to exclude air, thereby approximating the nonspoilage conditions which exist in silo or similar storage facility. By haylage is meant wilted grass or legume which is normally stored in the same manner as silage. By high moisture grain is meant grain which has a moisture content which would preclude storage in the open air. This moisture content is generally about 25 percent as compared to about 12 percent for grain which can be stored in air. The maximum weight of the compacted units is selected to correspond with the maximum weight which can be handled by conventional lifting equipment, currently about three tons. Preferably, each unit will include a pallet to facilitate its movement from one place to another.

The preferred embodiment of the invention includes a mobile machine which is capable of cutting and chopping the row crop and forming the fresh-cut silage into covered, palleted bales as the machine moves over the field. The bales may be transferred to a wagon or the like for transportation to another area or they may be deposited directly on the ground for future use in the same location.

Sealed bales of compacted silage, formed according to the principle of the present invention eliminate the need for a special storage facility, such as a silo, because the bales are highly resistant to spoilage even when stored outside. Since a silo is not required, it is evident that there is an additional savings in manpower and equipment in that there is no need for the machinery employed to feed the silage to the top of the silo. In practicing the invention the farmer may leave each sealed bale at the location where it was made merely by transferring it from the mobile baling machine to the ground. Alternatively, he may haul the bales to one or more storage locations where they will be kept until needed.

A further advantage of the sealed bales produced according to the principles of the present invention lies in the ease with which the silage may be made available for stock feeding purposes. First, since the silage has not been packed into a silo, it is not necessary to provide either manpower or machinery for unloading the silage when it is needed. Instead, it is necessary only to remove the cover from as many bales as desired and to release the straps or other structure, assuming that the bales have been left in a location where feeding is to occur. In practice it will usually be desirable to first place the pallets in a simple bin structure employed as a feeder.

A further advantage achieved by the present invention resides in the portability of the sealed bales. As already indicated, each bale is formed of a mass of silage having a maximum weight which can be handled by equipment conventionally employed on farms. Contemporary fork lift trucks and fork lift attachments for the power takeoff of tractors usually are capable of lifting about 3 tons, and this weight is therefore selected as the maximum for the bales. In practice this maximum weight will not always be employed, because the available equipment may be light duty equipment, or because the farmer may wish to feed a fewer number of animals. Three tons will feed approximately 100 cows for 1 day, and obviously a smaller herd will require less feed. However, weight alone is not the only aspect to be considered, and in practice a pallet or analogous structure will be provided for each bale so that the latter may be handled readily by a fork lift or by other types of lifting equipment. In the preferred embodiment the bale will be in direct contact with the pallet and the flexible covering encloses the upper end and the sides of the bale and is sealed to the pallet. The sealed bales are thus portable in the sense of being readily movable from place-to-place by means of equipment generally at hand on farms. Thus, the bales can be moved from place-to-place on a farm thereby lending flexibility to the manner of storing the sage and subsequently feeding it to the stock. In addition, the bales can be loaded onto and transported long distances by trucks or railway cars, a feature which has not been feasible heretofore due to the bulk of silage and its rapid spoilage under fresh-cut conditions.

The invention will be further understood from the following detailed description taken with the drawing in which:

FIGS. 1a through 1h are schematic views, in the nature of a flow sheet, illustrating a silage baling process embodying the principles of the present invention; and FIG. 2 is a schematic vertical sectional view of a mobile machine for carrying out the process illustrated in FIG. 1.

FIGS. 1a, 1b and 1c represent the operations of cutting a row crop 10 and chopping the cut crop into silage 12 which is then conveyed to a baling apparatus 14. The latter, as shown, includes a boxlike structure for receiving the silage and a vertically movable piston 16 for compressing the silage. The boxlike structure in the illustrated embodiment is constructed with a floor 18, sidewalls 20, a front wall in the form of a horizontally movable piston 22 and a rear wall in the form of a door 24 which is pivoted at its lower end at 26.

Before the silage is dumped into the box a conventional pallet 28 is placed on the floor 18. As shown, the pallet 28 is constructed of a horizontal floor member 30 and three spaced-apart, horizontally extending beam members 32. The pallet 28 may be of one of the conventional sizes, such as 4 feet by 4 feet.

After the box has been filled with, for example, 3 tons of silage the piston 16 is moved downwardly, as by a suitable hydraulic ram, so as to compress the silage, as illustrated in FIG. 1d. The compression drives out most of the air in the same manner as the natural compression which occurs as a silo is filled. In some instances it may be desirable to apply suction to the silage during compression to aid in removing air.

The final density of the compressed silage should be such that the remaining air will be consumed by aerobic bacteria without causing spoilage, again in the same manner as occurs in a silo. As indicated previously, a density of 60 pounds per cubic foot is generally sufficient. The actual pressure required to compress the silage to the desired density will vary with the nature of the silage. While compression with a single vertical piston is illustrated, it will be understood that horizontal pistons may be employed in place of or in conjunction with vertical pistons. It is contemplated, also, that the material may be compressed and subsequently placed on the pallet.

FIG. 1e illustrates the removal of the compressed silage, now in the form of a bale 34, from the box. This is accomplished in the illustrated embodiment by pivoting the rear door 24 downwardly and then moving the piston 22 to the right to move the bale 34 and the pallet 28 out onto the door 24. Pressure on the vertical piston 16 is maintained during this operation. Simultaneously, straps, twine or other confining means are applied to the bale 34. As shown, both vertical and horizontal straps are applied, and the vertical straps pass under the floor 30 of the pallet 28 thereby securing the latter to the bale 34.

Next, and referring to FIGS. 1f, 1g and 1h, the palletted bale 34 is packaged against contact with ambient air. Preferably, this is accomplished by covering the bale with a substantially airtight cover and sealing the cover to the bale or the pallet or both. As shown in FIGS. 1f and 1g a flexible plastic cover 36, preshaped to the general shape of the bale 34, is lowered over the bale 34 so as to surround the sides and upper end of the latter. The cover 36 may be of sufficiently rigid construction to be capable of reuse, or it may be more economically constructed as an expendable item. Sealing of the cover 36 may be accomplished in a number of different ways. As shown in FIG. 1h, the lower edge of the cover 36 is sealed, as by a heat-sealing operation or with the use of a suitable adhesive, to the four side edges of the floor 30 of the pallet 28. Air which has been trapped between the bale 34 and the cover 36 is removed by a vacuum pump 40 through a suitable fitting, such as a check valve, on the floor of the pallet or, as shown, on the cover 36. This operation also draws the cover 36 toward the bale 34 and aids in the sealing operation. In some cases it may be more desirable to purge the space between cover 36 and bale 34 with a inert gas and to pressurize the space slightly so that any subsequent gas leakage is outwardly rather than inwardly.

It will be understood that the exact manner of carrying out the compressing, sealing and air removal operations is not critical so long as nonspoilage conditions are obtained initially and retained for a substantial period thereafter.

Referring to FIG. 2, there is shown in simplified schematic form a mobile machine 42 which is capable of travelling over a field, cutting and chopping a row crop and continuously converting the chopped crop into sealed bales by the procedure illustrated more in detail in FIGS. 1a through 1h. The machine 42 includes a suitable frame which carries forward and rear ground-engaging wheels 44 and the various machinery for processing a crop. The sealed bales 34 may be discharged from the rear of the machine 42 directly onto the ground or, as shown, onto a wagon 46 which is towed by the machine 42.

The front portion of the machine 42 carries the cutting and chopping machinery which may be of any conventional type for cutting either a row crop or a forage crop. As shown, there is provided a row crop attachment 48 which includes a gatherer chain 50, a cutter 52 and an upwardly and rearwardly inclined feeder conveyor 54 which is looped over suitable sprockets 56. The conveyor 54 delivers the cut plant material to a rotating, floating feeder drum 58 which compresses the material onto a generally horizontal cutter plate 60. As the plant material slides over the rear edge of the plate 60 it is sheared by a rotating cutter drum 62 on which the shear bars can be adjusted to allow for changing the length of the sheared material. The sheared, or chopped material drops onto an upwardly and rearwardly inclined conveyor 64 and is transported, with the aid of a rotating, floating feeder drum 66 and a blower 70, into a compression chamber 68. A pallet 28 has been inserted previously into the lower end of the chamber so that the chopped material collects on the floor 30 the pallet 28.

The chamber 68, as shown, is defined by the elements 16, 18, 20, 22 and 24 described in connection with FIG. 1c. When a desired amount of chopped material has been fed into the chamber 68, the flow of material is stopped or diverted, and the piston 16 is forced downwardly by a suitable drive illustrated at 72. The drive may be a hydraulic ram or, as shown, an overcenter cam which forces the piston 16 up and down along a mechanically fixed path. When the desired density of the compacted material is attained, or when the piston reaches the bottom of its cammed stroke, the piston 16 is held in the down position. The pivoted door 24 then swings to the right, and the horizontal piston 22 moves the compacted mass, or bale 34 together with the pallet 28 out of the chamber 68. Suitable equipment 74 located just to the right of the chamber 68 applies straps as described in connection with FIG. 1e, and the pistons 16 and 22 return to their initial positions. A flexible cover 36 is then lowered over the bale and sealed to the side edges of the pallet 28 by the operations discussed in connection with FIGS. 1f through 1h. Finally, the sealed bales 34 are moved rearwardly over a floating ramp 76 onto the wagon 46.

While preferred embodiments of the present invention have been described, further modifications may be made without departing from the scope of the invention. Therefore, it is to be understood that the details set forth or shown in the drawings are to be interpreted in an illustrative, and not in a limiting sense, except as they appear in the appended claims.

What I claim is:

1. A method for preparing a fresh-chopped green crop material and a high moisture grain material for storage and subsequent stock feeding comprising: feeding a mass of the material onto a pallet located within a compression chamber; mechanically compressing the material on the pallet into the form of a high-density bale of substantial size having an interior air content which will not support appreciable aerobic bacterial disintegration and having a weight appropriate for handling by mobile power-driven lifting equipment; packaging the bale in a substantially airtight flexible cover until needed for stock feeding by enveloping the upper end and sides of the bale with said cover and sealing the cover to the pallet so that the cover closely engages the bale; and removing substantially all the air which initially occupies the space between the bale and the cover.

2. A method as in claim 1, wherein the mass of material is compressed to a density of about 60 pounds per cubic foot.

3. A method as in claim 1 wherein the mass of material weighs about 3 tons.